United States Patent
Watkins

(10) Patent No.: US 6,513,899 B1
(45) Date of Patent: Feb. 4, 2003

(54) COLORIMETRIC METHOD OF MANIPULATING INKING IN DIGITAL IMAGES

(76) Inventor: Christopher L. Watkins, 1271 Grisham La. Apt #C, Fairborn, OH (US) 45324

( * ) Notice: Subject to any disclaimer, the term of this patent is extended or adjusted under 35 U.S.C. 154(b) by 0 days.

(21) Appl. No.: 09/597,203

(22) Filed: Jun. 20, 2000

(51) Int. Cl.[7] ................ H04N 1/46; B41J 2/21
(52) U.S. Cl. ......................... 347/19; 358/504
(58) Field of Search ................ 347/14, 16, 19, 347/43; 358/1.1, 1.2, 1.9, 504, 518–253; 382/112

(56) References Cited

U.S. PATENT DOCUMENTS

| | | | | |
|---|---|---|---|---|
| 3,958,509 A | * | 5/1976 | Murray et al. ........... 101/350.1 |
| 5,182,721 A | * | 1/1993 | Kipphan et al. .......... 382/112 |
| 5,416,613 A | * | 5/1995 | Rolleston et al. ......... 358/518 |
| 5,563,985 A | * | 10/1996 | Klassen et al. ........... 395/109 |
| 5,956,469 A | * | 9/1999 | Liu et al. ............... 395/109 |
| 5,963,756 A | * | 10/1999 | Sakai et al. ............. 399/39 |
| 6,008,907 A | * | 12/1999 | Vigneau et al. .......... 358/1.9 |
| 6,027,201 A | * | 2/2000 | Edge .................... 347/19 |
| 6,084,689 A | * | 7/2000 | Mo ...................... 358/1.9 |
| 6,260,938 B1 | * | 7/2001 | Ostsuka et al. .......... 347/15 |

* cited by examiner

*Primary Examiner*—John Barlow
*Assistant Examiner*—Blaise Mouttet

(57) ABSTRACT

The present invention proposes a method of digitally manipulating inking in digital images to optimize the image by affecting the amount of ink put on the paper. This is accomplished by replacing some inkings with values determined from actual measurement, rather than with values derived from formulas. Digital image data is manipulated by means of multiple transformations, maintaining printed color quality while obtaining a more favorable inking. The technique of the present invention of manipulating inking is calorimetric, in that it is based on precise color measurements. The method of the present invention is based on hard data for the particular print system.

19 Claims, 1 Drawing Sheet

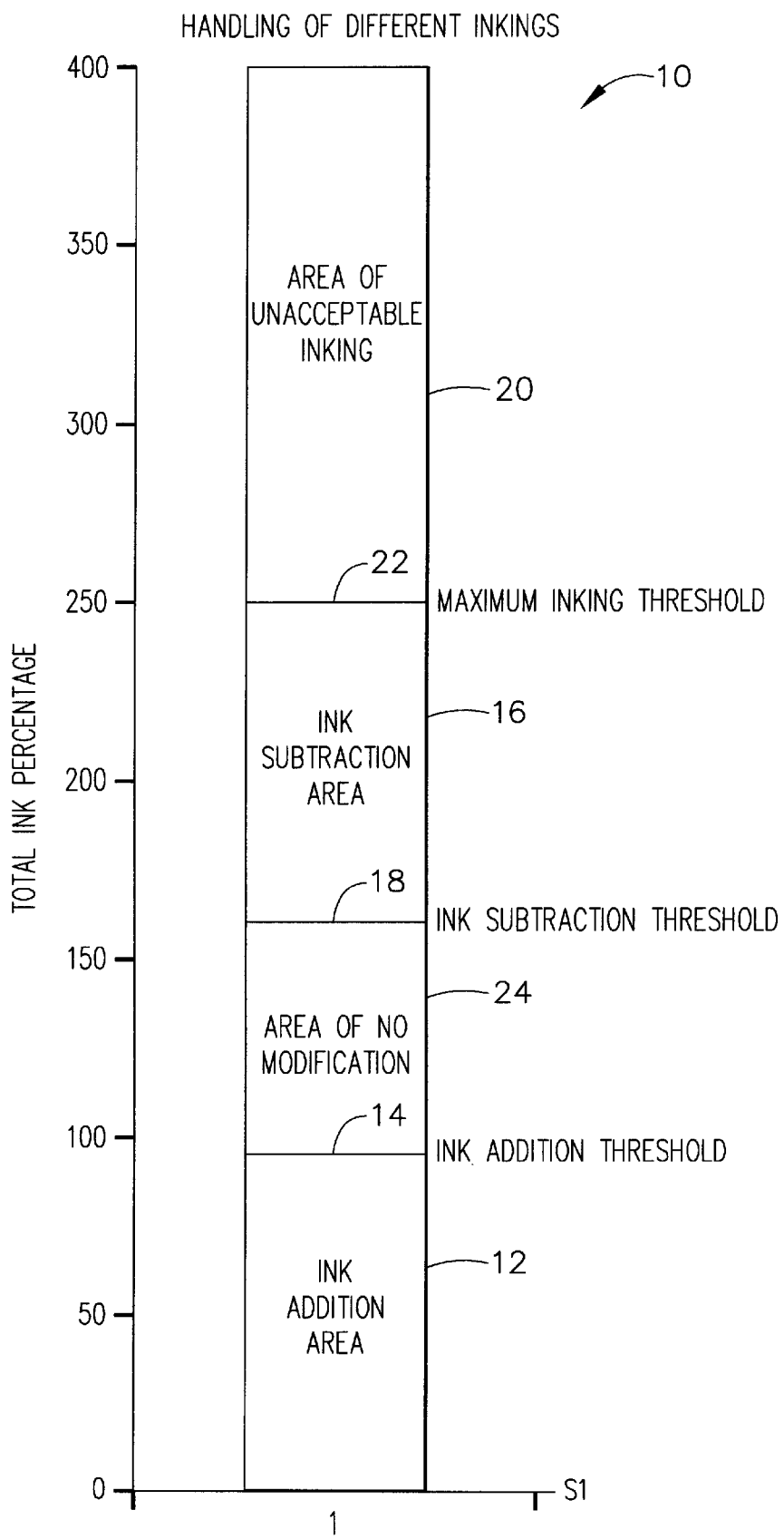

COLORIMETRIC METHOD OF MANIPULATING INKING IN DIGITAL IMAGES

TECHNICAL FIELD

The present invention relates to digital imaging and, more particularly, to a method of digitally manipulating the inking in an image in order to obtain a high quality print image with a favorable inking application, for any multicolor printing device.

BACKGROUND ART

Ink jet printing systems are known in which a print head defines one or more rows of orifices which receive an electrically conductive recording fluid, such as for instance a water based ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

Adapting traditional black-and-white technology to a full color printing process introduces unique problems. Four-color printing (cyan, magenta, yellow and black) places much more ink on the paper than black and white printing. The high water content of continuous ink jet inks makes this a particular problem, with noticeable negative effects. For instance, excessive inking causes the substrate to wrinkle. If too much ink is put onto the page, the ink seeps through to the reverse side of the paper. If the paper cannot be dried before it reaches the take-up roller, wet ink will rub off onto subsequent sheets. Also, ink can soak into the page and cover a larger area than intended. Large amounts of water in confined areas cause some areas of the paper to stretch, which makes it difficult to properly align all four printheads. Finally, colored ink is more expensive than black ink, and therefore less desirable to waste or reprint.

It would be desirable then to be able to maintain high quality of image saturation and density while reducing the amount of ink applied to the paper.

SUMMARY OF THE INVENTION

The present invention proposes a method of digitally manipulating inking in digital images to reduce the amount of ink put on the paper. Traditional methods of ink reduction, such as under color removal and grey component replacement attempt to reduce the total amount of ink in the image by taking advantage of the fact that cyan, magenta and yellow, mixed together, form a greyish color. Grey, then, can easily be represented by a percentage of black. Unfortunately, these traditional methods can cause color shifts in areas where the colored inks are not approximately equal, and can leave some colors unmanipulated that could have been used under color removal. Additionally, the results vary depending on the device used and the substrate used. The present invention overcomes all of these problems by replacing some inkings with values determined from actual measurement, rather than with values derived from formulas.

In accordance with one aspect of the present invention, digital image data is manipulated by means of multiple transformations, maintaining printed color quality while obtaining a more favorable inking. The technique of the present invention of manipulating inking is calorimetric, in that it is based on precise color measurements. In the existing art, methods of manipulating inking are based on theoretical behavior of inks and colors, while the method of the present invention is based on hard data for the particular print system.

Other objects and advantages of the invention will be apparent from the following description, the accompanying drawings and the appended claims.

BRIEF DESCRIPTION OF THE DRAWING

FIG. 1 is a graphical representation of the handling of different inkings, referenced to total ink percentage.

DETAILED DESCRIPTION OF THE PREFERRED EMBODIMENTS

The present invention proposes manipulating digital image data by means of several transformations, with the goal of maintaining printed color quality while obtaining a more favorable ink to substrate application.

By combining colored inks on a page, many colors can be generated. Sometimes two different inking combinations will produce identical colors. Although the two combinations may produce the same color, one combination may be more desirable than the other. The present invention compares every possible inking combination a device can produce to every other possible inking combination that device can produce. It will be obvious to those skilled in the art that this comparison may take many forms, such as, for example, a computer program. If any two inking combinations A and B happen to produce the same color, and inking combination A is more desirable (i.e., requires less ink), images processed via the technique of the present invention will have all areas of inking B replaced by inking A. This will typically reduce the amount of ink on the page, but it also can be used to increase the amount of ink, or increase one ink color while decreasing another ink color.

The present invention implements a series of steps to achieve the desired manipulation. Initially, the user prints a color test pattern, using the printer and the substrate with which it is desired to build a profile of for the inks. The inks can be any combination of colors such as, by way of example only, cyan, magenta, yellow and black (CMYK). The colors of each patch in the test pattern can be read by any suitable means, such as a spectrophotometer. The output is then provided. In a preferred embodiment of the present invention, the output is provided in L*a*b* format.

The L*a*b* value is a three-dimensional coordinate, with the L* axis referring to the lightness of the color point, the a* referring to how red (positive) or green (negative) the point is, and the b* referring to how yellow (positive) or blue (negative) the point is. For both a* and b*, values close to 0 are color neutral. In the L*a*b* coordinate system, the distance between two points indicates the degree of similarity between the two colors; small distances implying a close match between the colors and large distances implying quite dissimilar colors. In this coordinate system a distance of 1 Delta E, indicates a just noticeable color difference.

The output is fed to the comparison means, which completes an additional series of tasks. First, for each of the printed inking combinations the L*a*b* data is stored in a large array. This array links the L*a*b* value of each printed color with the coverage level for each of the four ink colors used to create the printed color. The distance in L*a*b* space from each CMYK inking value in this array is to every other possible CMYK inking combination in the array is then calculated. If the distance between two inking combinations is less than the color matching threshold distance, one can substitute the one inking for the other. Typically the color matching threshold distance is set to 1 Delta E, though other values could be used.

In theory, the distance in L*a*b* space from every possible CMYK inking value is determined compared to every other possible CMYK inking combination. In practice, however, it is only necessary to examine a small percentage of inking combinations. Using the comparison means, the user can dictate how carefully the possible combinations are searched. More careful searches can yield more favorable matches, but take much longer. In a suitable example, only 1296 color patches are printed and evaluated. Interpolation can be used from these points can be used for all other colors.

With the present invention, the guidelines for choosing between the equivalent inking combinations depend on the inking level. Referring now to FIG. 1, there is illustrated a graph 10 showing how different CMYK values are manipulated. In this bar graph, the vertical axis corresponds to the amount of ink placed on the paper. A value of 100 indicates that the amount of ink used is equal to that of full coverage with one ink. Similarly, a value of 400 implies the equivalent of full coverage with all four inks. As indicated in the graph, the guidelines for preferred inking choice depend on the ink loading level.

An ink addition area 12 is shown at a total ink percentage of less than 100. For original CMYK values with total inking below the first, and lowest, user-selectable threshold, or ink addition threshold, at 14, the program attempts to find a match that is identical in color, within a user-selectable color matching threshold distance, that is as close as possible to this minimum inking threshold 14. By using the inking combination which requires more drops to be printed, the image can be made less grainy. The resulting image is therefore smoother and more pleasing, while still maintaining the original color. Therefore, in area 12, ink can be added to the image, as needed.

For original CMYK values with total inking in an ink subtraction area 16, above a second user-selectable total inking threshold, or ink subtraction threshold, at 18, the comparison means attempts to find a match that is identical in color, within a user-selectable color matching threshold distance, that is as close as possible to this inking threshold 18. The goal here is to reduce the amount of ink used in darker, shadow areas 16 while still maintaining the original color. This reduces the ink loading of the paper to reduce paper curl and cockle, drying time and ink bleed through. With the present invention, the user can select a minimum black percentage to use. Any inking combinations with a value of black greater than zero and less than this minimum black will not be considered as a valid replacement. This was found to be necessary as black ink dots are much more visible than ink drops of any other color, and therefore can cause an appearance of graininess when only a few are present.

Area 20 is an area of unacceptable inking. For original CMYK values with total inking above the third (and highest) user-selectable total inking threshold at maximum inking threshold 22, the comparison means attempts to find the closest possible color match in inking combinations that are below the threshold 22. In this region, it is no longer required that the substitute inking combination lie within color matching threshold distance of the input inking combination. The goal here is to discard inking percentages that are simply unprintable by printing a close but not perfectly matched color. For example, inexpensive, commodity grade papers simply cannot handle high ink loadings. Any inking above a certain percentage will cause all manner of undesirable side effects, such as paper-wrinkling, show-through, ink bleed, registration errors, excessive drying times, and ink expense. So, for these papers, a maximum inking can be set that will never be exceeded. Obviously, the maximum inking level can be adjusted, depending on the ink and substrate being used. The present invention determines the best replacement possible for these excessive inkings, with the replacement always chosen from inking values beneath the maximum inking threshold, which may or may not be calorimetrically similar to the original inking.

Finally, area 24 is an area of no modification. For original inking totals between the first and second thresholds 14 and 18, respectively, no modification takes place. This region is smooth enough that adding ink is unnecessary, while removing ink could make the image too grainy.

Having determined the preferred inking combinations, a preferred inking substitution table can now be created. This table is constructed in the format CMYK1:CMYK2, where CMYK1 is the input inking value, and CMYK2 is the preferred inking substitution. In this table structure, CMYK1 is mapped back to itself for inking combinations where CMYK1 was the preferred ink choice among equivalent inkings or where there was no equivalent inking. With the limited number of color patches typically used to characterize the printing process, it is not always possible to find another printed color patch with a matching color. It is however possible to find several patch with colors close to original. From these it is generally possible to interpolate a matching color to the original. Therefore while each input CMYK1 value in the in the preferred inking substitution table corresponds to one of the printed color patches, the preferred inking substitution values CMYK2 need not correspond to any printed color patches.

The output table can be processed by any suitable means, such as through a well-known data smoothing algorithm, where each point is replaced by an average of nearby points. This is necessary if the user has set a minimum black percentage, as the sudden introduction of black into a gradient can cause a visual artifact known as contouring. Once the transformation table is completed, it can be saved to a permanent output means, such as a disk. It should be noted that each table is valid only for the device that printed the test pattern, on the paper the test pattern was printed on. If the device and/or the substrate changes, the test pattern must be reprinted, and the series of steps reapplied to determine the best replacement possible for the excessive inkings.

Once completed, the transformation table can be used to process images and color rendering dictionaries (CRDs). CRDs transform image data from the L*a*b* color coordinate space to the CMYK color coordinate space. The present invention can replace the CMYK values in the CRDs with new preferred CMYK values, derived from the values in the transformation table, with some interpolation possibly necessary. A similar process can be performed on images directly.

Once the comparison means has achieved its purpose of determining the optimum ink applications, the CRD it generates can be loaded into the digital front end of the printer to automatically be applied to every image that goes through the color correction workflow.

The invention has been described in detail with particular reference to certain preferred embodiments thereof, but it will be understood that modifications and variations can be effected within the spirit and scope of the invention.

What is claimed is:

1. A method for manipulating inking for a digital image printing system comprising the steps of:

identifying a printer and a substrate for use in color printing;

printing a color test pattern of a plurality of test patches with the identified printer and the identified substrate, where each test patch is printed with a distinct combination of primary inks;

reading in the plurality of test patches with a color measurement device to obtain L*a*b* data;

comparing each of the plurality of test patches with every other one of the plurality of test patches to generate alternate equivalent inking combinations for matching the color of an original test patch;

selecting a preferred inking combination from between the original test patch and the alternate equivalent inking combinations that optimally manipulates the inking of the digital image;

compiling a preferred inking substitution table which links each inking combination to its preferred equivalent inking combination to generate the preferred inking substitution table;

employing the preferred inking substitution table to identify preferred inking combinations for use in printing color images.

2. A method as claimed in claim 1 wherein the step of printing a color test pattern comprises the step of printing the color test pattern as a color file.

3. A method as claimed in claim 1 wherein the step of reading in the plurality of test patches with a color measurement device to obtain L*a*b* data comprises the step of using a spectrophotometer to read data from the printed patches to obtain the L*a*b* data.

4. A method as claimed in claim 3 further comprising the step of storing the L*a*b* data in a large array.

5. A method as claimed in claim 1 wherein the step of comparing comprises the step of using a computer to compare each of the plurality of test patches with every other one of the plurality of test patches.

6. A method as claimed in claim 1 wherein the step of selecting a preferred inking combination comprises the step of selecting a preferred inking combination based on ink loading level.

7. A method as claimed in claim 6 wherein the step of selecting comprises the step of using ink loading levels where no change is made to the inking combination.

8. A method as claimed in claim 6 wherein the step of selecting comprises the step of defining an ink addition threshold value below which the inking combination which uses more ink is preferred.

9. A method as claimed in claim 6 wherein the step of selecting comprises the step of reducing ink used in darker areas while maintaining original color.

10. A method as claimed in claim 6 wherein the step of selecting comprises the step of defining an ink subtraction threshold value above which the inking combination which uses less ink is preferred.

11. A method as claimed in claim 1 wherein the step of selecting a preferred inking combination comprises the steps of:

defining an ink addition threshold;

defining an ink subtraction threshold;

defining a maximum inking threshold.

12. A method as claimed in claim 11 wherein inking below the ink addition threshold can be increased.

13. A method as claimed in claim 11 wherein inking above the ink addition threshold and below the ink subtraction threshold defines an area in which inking is not modified.

14. A method as claimed in claim 11 wherein inking above the ink subtraction threshold and below the maximum inking threshold defines an area in which inking can be decreased.

15. A method as claimed in claim 11 wherein inking above the maximum inking threshold is replaced with inking selected from an output table of acceptable inkings.

16. A method as claimed in claim 1 wherein the preferred inking substitution table is used to produce a CRD.

17. A method as claimed in claim 1 wherein the step of generating alternate equivalent inking combinations further comprises the step of identifying colors within a color matching threshold distance from an original color.

18. A method as claimed in claim 17 wherein the color matching threshold distance is user selectable.

19. A method as claimed in claim 17 wherein the color matching threshold distance is set to approximately 1 Delta E.

* * * * *